United States Patent
Querejeta Andueza

(10) Patent No.: US 10,054,244 B2
(45) Date of Patent: Aug. 21, 2018

(54) SHUT-OFF GAS VALVE

(71) Applicant: COPRECITEC, S.L., Aretxabaleta (ES)

(72) Inventor: Felix Querejeta Andueza, Hendaye (FR)

(73) Assignee: Copreci, S. Coop., Aretxbaleta (ES)

( * ) Notice: Subject to any disclaimer, the term of this patent is extended or adjusted under 35 U.S.C. 154(b) by 35 days.

(21) Appl. No.: 14/948,783

(22) Filed: Nov. 23, 2015

(65) Prior Publication Data

US 2016/0265677 A1 Sep. 15, 2016

Related U.S. Application Data

(63) Continuation of application No. PCT/EP2014/060820, filed on May 26, 2014.

(30) Foreign Application Priority Data

May 27, 2013 (EP) .................................... 13382194

(51) Int. Cl.
*F16K 31/02* (2006.01)
*F16K 31/06* (2006.01)
(Continued)

(52) U.S. Cl.
CPC ............ *F16K 31/0655* (2013.01); *F16K 1/12* (2013.01); *F16K 31/0672* (2013.01);
(Continued)

(58) Field of Classification Search
CPC ............... F16K 31/402; F16K 31/0693; F16K 31/0655; F16K 31/1082; F16K 1/12;
(Continued)

(56) References Cited

U.S. PATENT DOCUMENTS 2,309,709 A 2/1943 Paille
2,466,515 A 4/1949 Van Denberg et al.
(Continued)

FOREIGN PATENT DOCUMENTS

DE 202007002760 U1 4/2007
DE 102008027546 A1 12/2009
(Continued)

OTHER PUBLICATIONS

European Search Report, EP13382194, Feb. 24, 2014, 11 pages.
International Search Report and the Written Opinion, PCT/EP2014/060820, Sep. 10, 2014, 11 pages.

*Primary Examiner* — Umashankar Venkatesan
(74) *Attorney, Agent, or Firm* — Edell, Shapiro & Finnan, LLC

(57) ABSTRACT

A shut-off valve that according to one implementation comprises an inlet, an outlet, an intermediate orifice for communicating the outlet with the inlet, a closure member that closes the intermediate orifice in a closing position and prevents said communication and not preventing said communication in an opening position, and an electromagnetic actuator to cause the closure member to change position. The electromagnetic actuator comprises a static armature, a static permanent magnet and a movable element attached to the closure member. The movable element comprises a bobbin associated with the armature with freedom of movement and a coil wound around and attached to the bobbin, cooperating with the permanent magnet depending on its power supply to cause the closure member to change position.

13 Claims, 6 Drawing Sheets

(51) Int. Cl.
*F23N 1/00* (2006.01)
*F23N 5/24* (2006.01)
*F16K 1/12* (2006.01)
*F16K 31/08* (2006.01)

(52) U.S. Cl.
CPC ........ F16K 31/0675 (2013.01); F16K 31/082 (2013.01); F23N 1/005 (2013.01); F23N 5/245 (2013.01); F23N 2035/14 (2013.01); F23N 2035/22 (2013.01); F23N 2035/24 (2013.01)

(58) Field of Classification Search
CPC ............ F16K 31/0672; F16K 31/0675; F23N 2035/22; F23N 2035/24; F23N 2035/14; F23N 1/005; F23N 5/245
USPC .......................................................... 251/17
See application file for complete search history.

(56) References Cited

U.S. PATENT DOCUMENTS

| | | | | |
|---|---|---|---|---|
| 2,502,591 | A | | 4/1950 | Ray |
| 2,826,215 | A | * | 3/1958 | Wolfslau ............. F16K 31/0689 137/454.6 |
| 2,915,681 | A | * | 12/1959 | Troy ..................... H01F 7/1646 335/229 |
| 3,420,492 | A | * | 1/1969 | Ray ...................... F16K 31/082 251/129.17 |
| 4,403,765 | A | * | 9/1983 | Fisher .................. F16K 31/082 137/625.65 |
| 4,632,358 | A | * | 12/1986 | Orth .................... B60H 1/00485 251/117 |
| 4,664,355 | A | * | 5/1987 | Kubach ................ H01F 7/1646 251/129.09 |
| 4,683,452 | A | * | 7/1987 | Henley ................. H01F 7/1646 335/234 |
| 5,094,218 | A | | 3/1992 | Everingham et al. |
| 5,135,027 | A | * | 8/1992 | Miki ................... F16K 31/0631 137/596.17 |
| 5,272,458 | A | * | 12/1993 | Hoffman ............ H01H 51/2209 335/179 |
| 5,727,769 | A | * | 3/1998 | Suzuki ................. F16K 31/082 251/129.15 |
| 6,983,923 | B2 | * | 1/2006 | Fukui ................... A61B 5/0235 251/65 |
| 8,567,062 | B2 | * | 10/2013 | Querejeta Andueza ............................. F16K 27/029 137/487.5 |
| 2003/0089351 | A1 | | 5/2003 | Cook |
| 2008/0204175 | A1 | | 8/2008 | Barabas-Lammert |
| 2010/0252114 | A1 | | 10/2010 | Hoffmann |
| 2012/0313019 | A1 | * | 12/2012 | Neudeck ............... F16K 31/082 251/65 |

FOREIGN PATENT DOCUMENTS

| | | |
|---|---|---|
| EP | 2423545 A1 | 2/2012 |
| EP | 2444730 A1 | 4/2012 |

* cited by examiner

SHUT-OFF GAS VALVE

CROSS-REFERENCE TO RELATED APPLICATIONS

This application relates to and claims the benefit and priority to International Application No. PCT/EP2014/060820, filed May 26, 2014, which claims the benefit and priority to European Application No. 13382194.2, filed May 27, 2013.

TECHNICAL FIELD

The present invention is related to gas valves, particularly to shut-off gas valves which are electrically operated to change their state (from closed to open or from open to closed).

BACKGROUND

The use of gas valves in gas appliances is well-known, some of them being shut-off valves where the valve can move between two positions: a closing position and an opening position. The valves are placed in the path of the gas, usually in a conduit, to allow or prohibit communication between two points, allowing the gas to reach a destination point from an origin point, or preventing it from doing so. Shut-off valves comprise an inlet for receiving the gas from the origin point, an outlet through which the gas exits towards the destination point, and an intermediate orifice communicating the outlet with the inlet, the intermediate orifice being closed or opened to allow the gas to reach the outlet or to prohibit it. A shut-off valve prevents fluidic communication between the inlet and the outlet, preventing the passage of gas when it is in the closing position where it blocks the intermediate orifice, and allows said fluidic communication when it is in the opening position where it does not block the intermediate orifice.

Some valves of this type are electrically operated, being dependent on an electric power supply to change their position or state: from the closing position to the opening position or vice versa.

Some electrically operated valves correspond to electromagnetic shut-off valves in which electric energy is converted into mechanical energy to cause the change of state of the valve as a result of the action of a magnetic field. The valve comprises a coil and a ferromagnetic core or armature and when the coil is fed with an electric current a magnetic field is generated, causing the movement of the armature which causes the change of state of the valve (change of position). The armature is associated with a closure member that moves integrally with it, which is responsible for blocking the intermediate orifice in the closing position of the valve.

Document US 2003/0020037 A1 discloses a control valve comprising an electromagnetic shut-off valve. The valve comprises a static bobbin on which the coil and the armature are arranged. The coil is fixed to the bobbin and the armature can move in a longitudinal direction with respect to the bobbin, changing the state of the valve (from open to closed or vice versa) when this movement occurs.

SUMMARY OF THE DISCLOSURE

The shut-off gas valve may comprise a gas inlet through which it receives gas from an external source, a gas outlet through which the gas exits the valve, and an intermediate orifice which is arranged between the inlet and the outlet and through which the outlet is communicated with the inlet. The valve further comprises a closure member which can be positioned in a closing position in which it blocks the intermediate orifice, preventing the passage of gas through the intermediate orifice from the inlet towards the outlet, or in an opening position in which it does not block the intermediate orifice, allowing said passage; and an electromagnetic actuator acting on the closure member to cause it to change position.

The electromagnetic actuator may comprise a static armature, a static permanent magnet and a movable element. The movable element comprises a bobbin associated with the armature with freedom of movement and a coil which is wound around and attached to the bobbin and cooperates with the permanent magnet depending on its power supply to cause the closure member to change position. The closure member is attached to the movable element such that it moves integrally with said movable element, thereby being able to cause the movement of the closure member depending on the power supply of the coil.

When the coil starts to be fed with a specific current a magnetic field interacting with the magnetic field of the permanent magnet is generated, causing the movement of the movable element and therefore of the closure member. When the coil is no longer fed with a current or when it is fed with a current in the opposite direction, the movable element moves in the opposite direction and the closure member returns to its initial position.

Because the coil and the bobbin, and not the armature, move integrally with the closure member, the mass that has to be moved is less, thereby the energy necessary for achieving this movement is also less, a low energy consumption valve being obtained. This further means that the number of turns of the coil to be wound on the bobbin and/or the thickness of the copper wire forming the coil can be also reduced, which further contributes to a decrease in the cost of the valve, and it also contributes to being able to feed the valve voltages that are characteristic of electronic devices (5 volts for example) instead of 12 volts or 24 volts that are normally needed, which improves energy performance and further facilities incorporating the valve in different appliances where it is common practice to use voltages characteristic of electronic devices.

These and other advantages and features of the will become evident in view of the drawings and of the detailed description.

DETAILED DESCRIPTION

Figure 1:
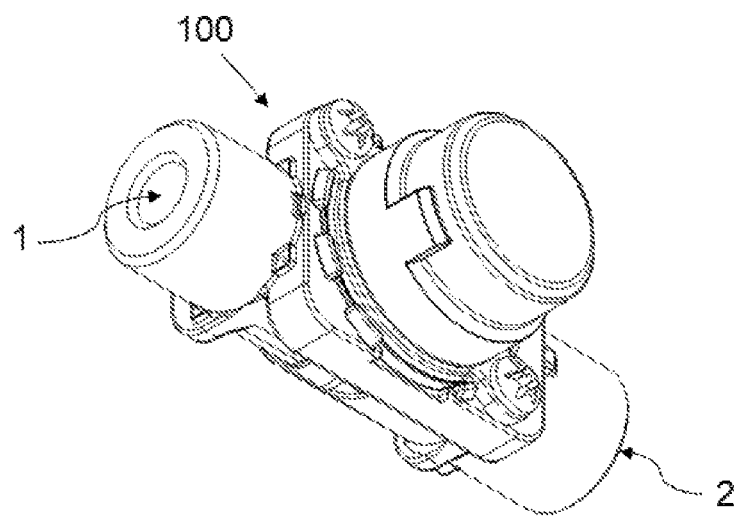
FIG. 1 shows a perspective view of a shut-off gas valve according to one embodiment.

FIG. 1 shows an exemplary outer appearance of a shut-off gas valve 100 according to one embodiment. The valve 100 comprises a gas inlet 1 through which it receives gas from an external source, a gas outlet 2 through which the gas exits the valve 100, an intermediate orifice 3 through which the outlet 2 is communicated with the inlet 1 and gas reaches the outlet 2 from the inlet 1, a closure member 45 blocking or closing the intermediate orifice 3 in a closing position, preventing the passage of gas towards the outlet 2, and not cooperating with the intermediate orifice 3 in an opening position, not preventing said passage of gas, and an electromagnetic actuator acting on the closure member 45 to cause it to change position.

Figure 2:
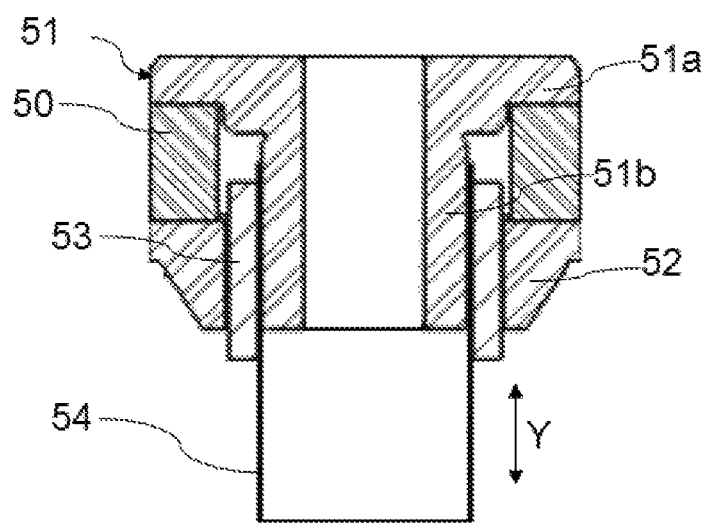
FIG. 2 shows an embodiment of an electromagnetic actuator of a shut-off gas valve.

FIG. 2 shows an embodiment of an electromagnetic actuator of the valve 100 of the invention by way of example. The electromagnetic actuator comprises a static armature, a static permanent magnet 50 and a movable element which is attached to the closure member 45, the closure member 45 moving integrally with the movable element. The movable element comprises a bobbin 54 associated with the armature with freedom of movement in a direction Y and a coil 53 which is wound around and attached to the bobbin 54. The armature comprises a first member 51 comprising a circular section 51a and a cylindrical section 51b prolonging centrally and perpendicularly from the circular section 51a, and a second annular member 52. The cylindrical section 51b is housed at least partially in the bobbin 54, the bobbin 54 being associated with the armature by means of the first member 51. The second member 52 is traversed by the bobbin 54, by the coil 53 wound around and fixed to the bobbin 54 and by the cylindrical section 51b of the first member 51. The permanent magnet 50 remains secured and static between both members 51 and 52 of the armature, which further maintain their position with the aid of the permanent magnetic field generated by the permanent magnet 50. The permanent magnet 50 has an annular shape and, like the second member 52 of the armature, is traversed by the bobbin 54, by the coil 53 wound around and fixed to the bobbin 54 and by the cylindrical section 51b of the first member 51. The closure member 45 (not shown in FIG. 2) is at least partially snap fitted in the bobbin 54, thereby being attached to said bobbin 54.

The movement of the movable element, and therefore of the closure member 45 attached to it, occurs depending on the power supply of the coil 53. When the coil 53 starts to be fed with a specific current, a magnetic field interacting with the permanent magnetic field generated by the permanent magnet 50 is generated, causing the movement of the movable element in the direction Y and therefore of the closure member 45 since both the armature and the permanent magnet 50 are static. When the coil 53 is no longer fed, the movable element can move in the opposite direction so that the closure member 45 returns to its initial position as a result of a spring 9 (not shown in FIG. 2) which exerts a force on the closure member 45 and which will be described below, or said movement can occur when the coil 53 is fed with a current in the opposite direction, as will also be described below. The spring 9 can further be used to confer the initial state of the valve 10, open (closure member 45 in opening position) or closed (closure member 45 in the closing position).

Figure 3:
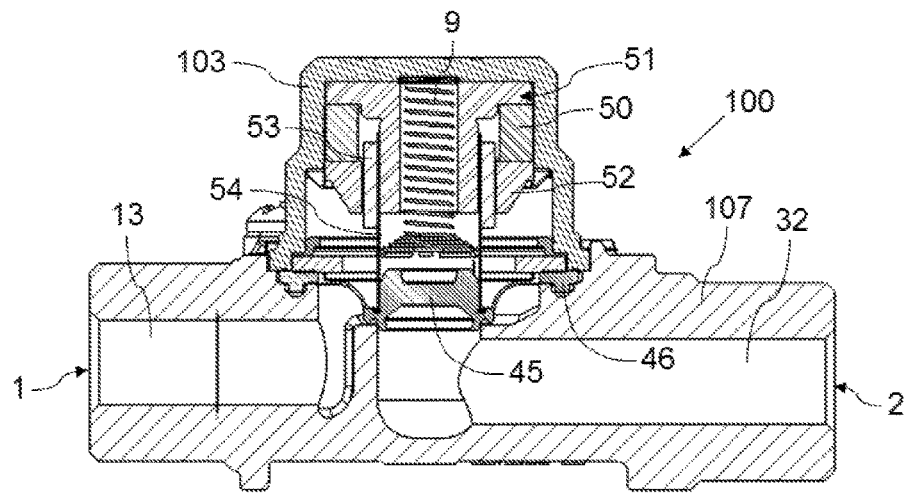
FIG. 3 shows a section view of a first embodiment of a shut-off gas valve according to a longitudinal section with the closure member in a closing position.

As shown in FIG. 3 for example, the valve 100 comprises a body 107 incorporating the inlet 1, the outlet 2, the intermediate orifice 3, an inlet conduit 13 communicating the inlet 1 with the intermediate orifice 3 and an outlet conduit 32 communicating the intermediate orifice 3 with the outlet 2. The intermediate orifice 3 and part of the inlet conduit 13 are accessible from outside the body 107, and the valve 100 comprises a casing 103 which is attached to the body 107 and closes the access from outside to said part of the inlet conduit 13 and to the intermediate orifice 3, and a sealing member 46 for closing the area of attachment between the body 107 and the casing 103 in a leak-tight manner. The body 107 delimits a first enclosure inside the valve 100 and a second enclosure is delimited inside the valve 100 between the body 107 and the casing 103 where the electromagnetic actuator is housed, the second enclosure being communicated at all times with the first enclosure.

Figure 4:
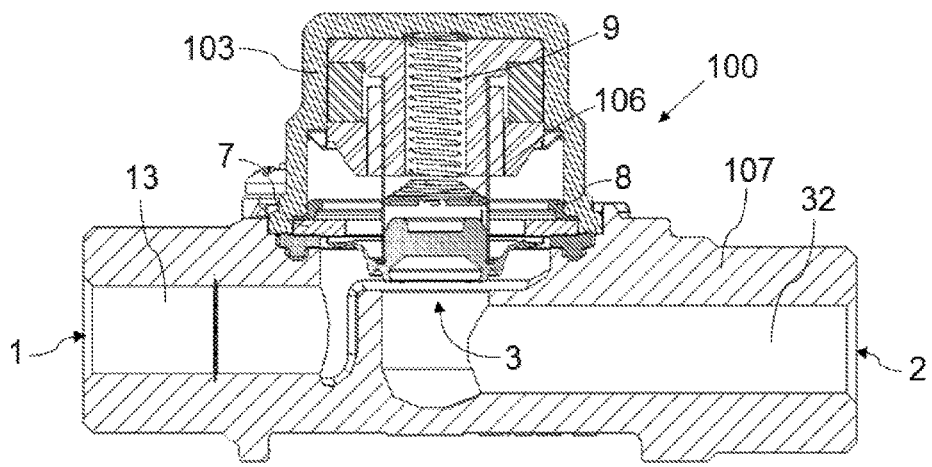
FIG. 4 shows a section view of the shut-off gas valve of FIG. 3 with the closure member in an opening position.

In a first embodiment shown by way of example in FIGS. 3 and 4, shut-off valve 100 corresponds to an ON-OFF type shut-off valve, such that the closure member 45 changes position when the coil 53 is fed with a current and when the coil 53 is no longer fed with a current. The closure member 45 and the sealing member 46 are part of one and the same element corresponding to a membrane 4 which is made from an elastomeric material and splits the inside of the valve 100 into the first enclosure and into the second enclosure, the first enclosure being delimited by the body 107 and a first face of the membrane 4 and the second enclosure being delimited by a second opposite face of the membrane 4 and the casing 103. Since an elastic membrane 4 is used, on one hand the same element assures the sealing against the exterior between the casing 103 and the body 107 (function of the sealing member 46) and on the other hand the same element allows blocking the intermediate orifice 3 (function of the closure member 45). Furthermore, as a result of using a membrane 4 the centering of the closure member 45 with respect to the intermediate orifice 3 can be improved in a simple manner. The membrane 4 is made of an elastomeric material, so the incorporation of a membrane 4 does not require a significant energy increase for moving the closure member 45 as a result of its elastic properties, the indicated advantages being obtained without any adverse effects worth mentioning.

Figure 5:
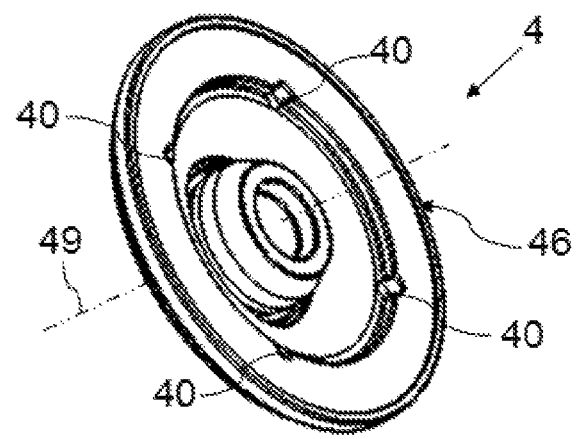
FIG. 5 shows a perspective view of a membrane of the valve of FIG. 3 where one face of said membrane is shown.
Figure 6:
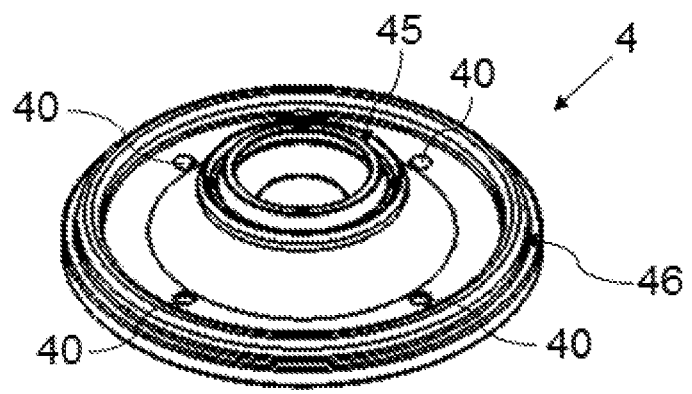
FIG. 6 shows a perspective view of the membrane of FIG. 5 where the opposite face of said membrane is shown.

Shown by way of example in FIGS. 5 and 6, the membrane 4 comprises a plurality of through holes 40 whereby the second enclosure of the valve 100 is communicated with the first enclosure of said valve 100, at least part of the gas from the inlet 1 reaching the second enclosure by means of the through holes 40. In this embodiment, the membrane 4 comprises four through holes 40 and they are distributed symmetrically with respect to a central axis 49 of the membrane 4, such that the gas traversing the through holes 40 does not generate different side tensions in the membrane 4 that could negatively affect the centering of the closure member 45 with respect to the intermediate orifice 3.

As a result of the through holes 40 (or the through hole 40 if there is only one), the gas is present in both enclosures inside the valve 100, and there is no difference in pressures caused by the gas between the two faces of the membrane 4, such that to move the closure member 45 from one position to another, the force exerted on said closure member 45 due to the difference in pressures between its two opposite faces has no effect whatsoever, so the energy needs of the electromagnetic actuator for moving the closure member 45 drop with respect to a solution without through holes 40, where the two enclosures would not be communicated, and lower energy consumption of the valve 100 is achieved.

Splitting the inside of the valve 100 into two different enclosures by means of the membrane 4 allows facilitating its manufacture, particularly its assembly. For example, the membrane 4 can thus be arranged in its position on the body 107, the electromagnetic actuator can then be assembled and finally the casing 103 can be attached to the body 107. It would also be possible to form an assembly between the membrane 4 and the electromagnetic actuator, to arrange said assembly in its position on the body 107 and to finally attach the casing 103 to body 107, for example.

In the first embodiment, the valve 100 further comprises a printed circuit board 7 which is attached to the electromagnetic actuator and through which the power supply reaches the coil 53, arranged in the second enclosure inside the valve 100 and comprising a section (not depicted in the drawings) accessible from outside the valve 100 through which the power supply arrives for the electromagnetic actuator (for the coil 53), so the electromagnetic actuator is fed in a simple manner from outside the valve 100. The valve 100 further comprises an additional element 8 arranged in the second enclosure on the printed circuit board 7 to prevent the inside of the valve 100 from having outward leaks due to the section of the printed circuit board 7 which is accessible from the outside. The printed circuit board 7 is therefore arranged between the membrane 4 and the additional element 8. As a result of the additional element 8, the gas present in the second enclosure is prevented from escaping outward due to the connection between the printed circuit board 7 and the outside, which allows maintaining the balance of pressures on the membrane 4 and the necessary safety requirements. The additional element 8 preferably corresponds to an O-ring or an equivalent element.

As previously mentioned, the spring 9 causes the closure member 45 to be in a specific (closed or open) position at first, which state in the valve 100 is commonly referred to normally as open (closure member 45 in an opening position) or normally as closed (closure member 45 in a closing position). When the coil 53 is fed, the resulting force that is generated due to its magnetic field and to that of the permanent magnet 50 causes the movement of the closure member 45 towards its closing position or towards its opening position (depending on how the valve 100 is initially configured), overcoming the force exerted by the spring 9 on the closure member 45. In the first embodiment, when the coil 53 is no longer fed the resulting force disappears or drops and the closure member 45 recovers its previous position as a result of the force exerted by the spring 9.

As shown in FIGS. 3 and 4, in the first embodiment the spring 9 forces the valve 100 to be normally closed, it is arranged in the second enclosure of the valve 100, attached at a first end to the casing 103, associated at a second end with the closure member 45 and compressed or decompressed when the closure member 45 changes position. The first member of the armature 51 comprises a central hole 51c for housing the spring 9, and inside the bobbin 54 the valve 100 comprises an element 106 fixed to the bobbin 54 to which the second end of the spring 9 is attached, said second end thereby being associated with the closure member 45. The spring 9 is housed at least partially in the bobbin 9.

In other embodiments of the valve 100 related to the first embodiment, the valve 100 can be similar to the valve of the first embodiment but it can comprise a number of through holes 40 different from four (even just one), can have a different distribution of the through holes 40, and/or can comprise a different configuration so that the spring 9 forces the valve 100 to be normally open instead of normally closed, the coil 53 needing to be fed current so that it causes the bobbin 54 to move in a direction resulting in the closure member 45 assuming a closing position instead of an opening position.

Figure 7:
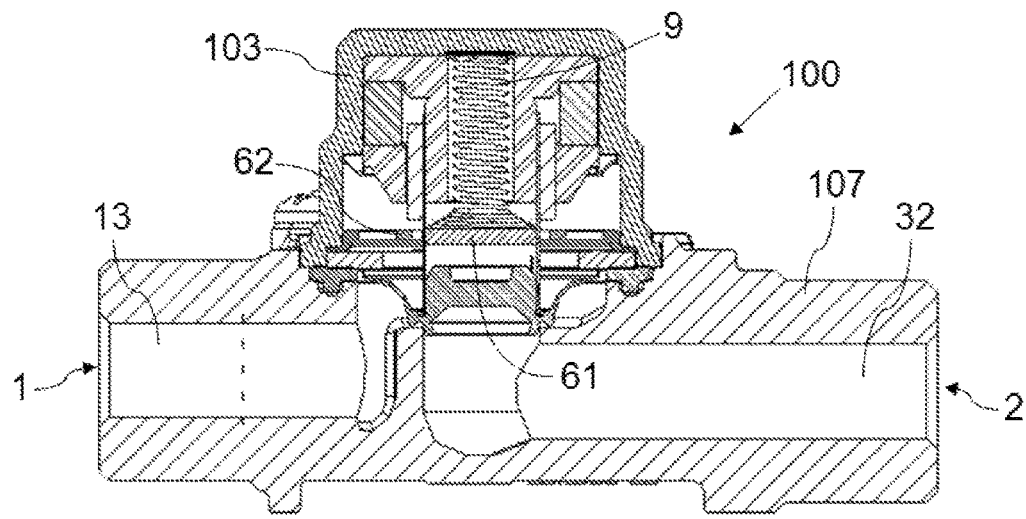
FIG. 7 shows a section view of a second embodiment of a shut-off gas valve according to a longitudinal section with the closure member in a closing position.
Figure 8:
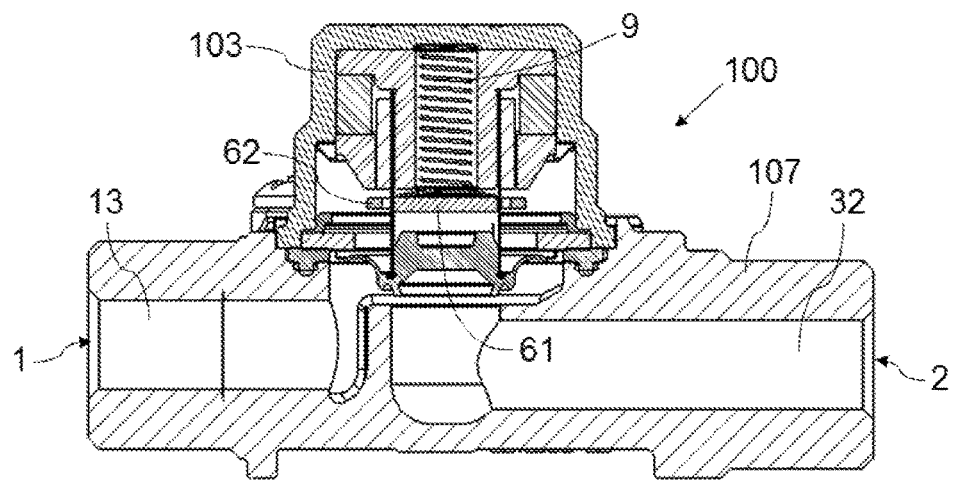
FIG. 8 shows a view of the shut-off gas valve of FIG. 7 with the closure member in an opening position.

In a second embodiment shown by way of example in FIGS. 7 and 8, the shut-off valve 100 corresponds to a flip-flop shut-off valve, such that the closure member 45 changes position when the coil 53 is fed a current and maintains its position in response to the absence of power supply of the coil 53, one power supply pulse being enough, according to one embodiment, to cause the change of position and the direction of the movement of the movable element depending on the polarity of said pulse. The valve 100 of the second embodiment is similar to the valve of the first embodiment but further comprises two ferromagnetic elements 61 and 62 to turn it into a flip-flop valve. The ferromagnetic elements 61 and 62 are fixed to the movable element and are positioned such that when the coil 53 is fed a current, the ferromagnetic elements 61 and 62 are located within the magnetic field resulting from the cooperation between the magnetic fields of the permanent magnet 50 and of the coil 53 itself. Therefore due to its ferromagnetic properties, when the closure member 45 moves to the opening position due to the power supply of the coil 53 the ferromagnetic elements 61 and 62 are attracted by the permanent magnet 50, thereby staying that way even in response to the absence of power being supplied to the coil 53 (the magnetic field of the permanent magnet 50 being enough to maintain the position). The power supply of the electromagnetic actuator therefore does not need to be maintained to keep the valve 100 open, and lower power consumption of the valve 100 is achieved, a flip-flop behavior being achieved in the valve 100.

Figure 9:
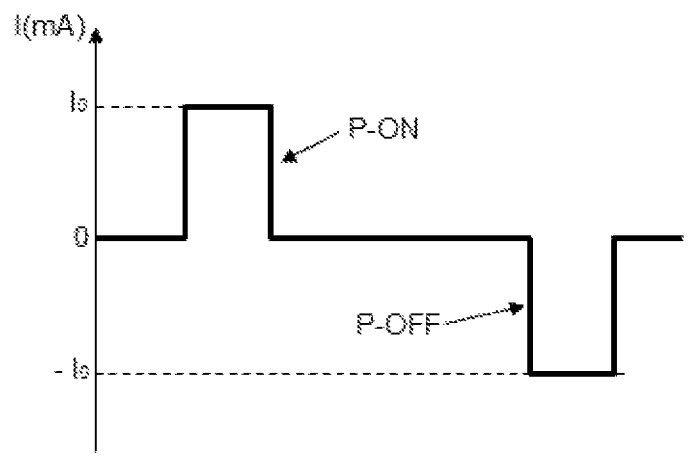
FIG. 9 shows by way of example a power supply sequence of a coil of the electromagnetic actuator for closing and opening the valve of FIGS. 7 and 8.

To return the closure member 45 to its closing position, simply feed the coil 53 with a current in the opposite direction, so the valve 100 opens with a current pulse P-ON in one direction, and the valve 100 closes with a current pulse P-OFF in the opposite direction. A small pulse P-ON of the current I of a specific amplitude $I_0$ in one direction is therefore enough to open the valve 100, in the order of milliamperes (mA), and a small pulse P-OFF of the current I of a specific amplitude $I_0$ in the opposite direction is enough to close the valve 100, as shown by way of example in FIG. 9.

The first ferromagnetic element 61 is arranged inside the bobbin 54, fixed to said bobbin 54, and the second ferromagnetic element 62 is arranged outside said bobbin 54, fixed to said bobbin 54. The first ferromagnetic element 61 preferably corresponds to a disc and the second ferromagnetic element 62 corresponds to an annular part, and they are concentric with respect to a central axis 55 of the bobbin. The first ferromagnetic element 61 could perform the function of the element 106 described in the first embodiment, so in this case said element 106 would not be necessary (the second end of the spring 9 would be fixed to the first ferromagnetic element 61).

As occurred with the first embodiment, in other embodiments of the valve 100 related to the second embodiment the valve 100 can be similar to the valve of the second embodiment but can comprise a number of through holes 40 different from four (even just one), can have a different distribution of the through holes 40, and/or can comprise a different configuration so that the spring 9 forces the valve 100 to be normally open instead of normally closed, the coil 53 needing to be fed so that it closes instead of opens. Furthermore, instead of two ferromagnetic elements 61 and 62 other embodiments can comprise a single ferromagnetic element arranged inside the bobbin 54 or arranged outside the bobbin 54 (surrounding it). In the first case the valve 100 would not need the element 106 because the ferromagnetic element would perform its function; the second end of the spring 9 would be fixed to the ferromagnetic element. In the case of having a single ferromagnetic element, the lines of the magnetic field generated by the permanent magnet 50 that are used are smaller than in the case of having two ferromagnetic elements, so the necessary power supply of the coil 53 would be greater.

In the second embodiment and in any of the embodiments related to the second embodiment, the ferromagnetic elements 61 and 62 (or the single ferromagnetic element) can comprise an intentionally selected Curie temperature to provide thermal safety. When the Curie temperature is reached in the area surrounding the ferromagnetic elements 61 and 62, said ferromagnetic elements 61 and 62 lose their ferromagnetic properties and are no longer attracted by the permanent magnet 50, the spring 9 causing the closure member 45 to return to its closing position even though the coil 53 has not been fed with a current pulse P-OFF. The Curie temperature can be comprised for example between 90° C. and 130° C., corresponding to the temperature that can be reached in the area around the valve 100 when it (and/or the appliance in which it is assembled) is working in normal conditions. If this temperature is exceeded, it is interpreted that an anomaly has occurred (a fire, for example), and the passage of gas through the valve 100 is cut off to prevent possible greater damage. The choice of the Curie temperature could also be different, depending on the area in which the use of the valve 100 is envisaged.

Figure 10:
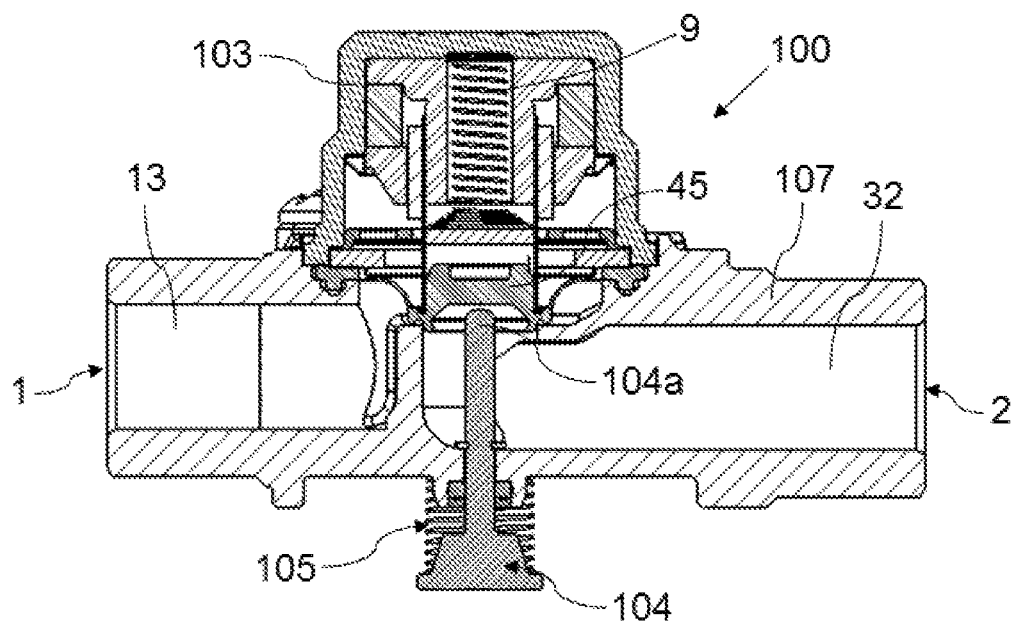
FIG. 10 shows a section view of a third embodiment of a shut-off gas valve according to a longitudinal section with the closure member in a closing position.
Figure 11:
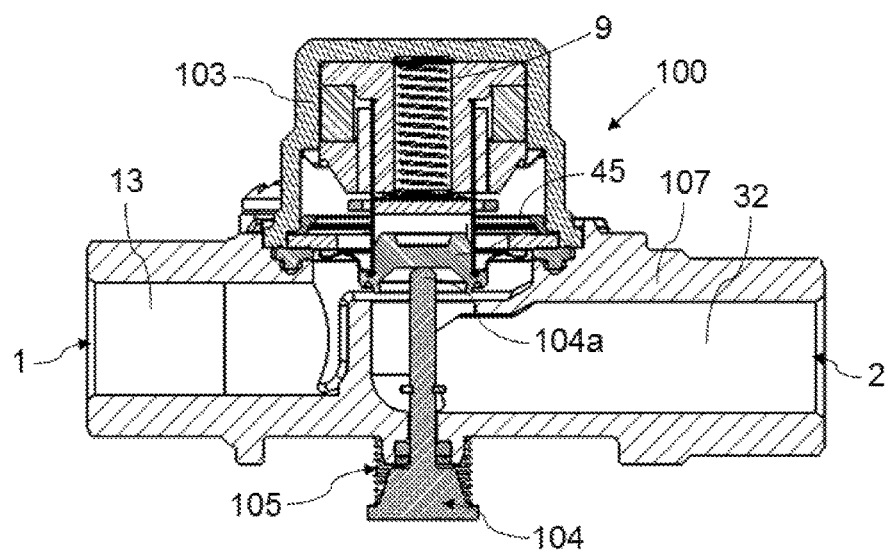
FIG. 11 shows a view of the shut-off gas valve of FIG. 6 with the closure member in an opening position.

In a third embodiment shown by way of example in FIGS. 10 and 11, the shut-off valve 100 corresponds to a flip-flop shut-off valve that can be operated manually. The valve 100 of the third embodiment is similar to the valve of the second embodiment but further comprises a manual actuator 104 accessible from the outside so that it can be operated manually. In the third embodiment, the position of the valve 100 can be changed manually from closed to open, but not from open to closed. The valve 100 could therefore be used even in response to the absence of electric energy, because it could be opened manually.

Like the valve 100 of the second embodiment, the valve 100 of the third embodiment acts electronically, so its operation will not be explained again. Its manual operation is explained below.

When the manual actuator 104 is operated manually, said actuator acts on the closure member 45 moving it to the opening position. Due to the permanent magnetic field of the permanent magnet 50, the ferromagnetic elements 61 and 62 are attracted by the permanent magnet 50, and they stay that way until the coil 53 is fed with a pulse P-OFF or until the ferromagnetic elements 61 and 61 lose their ferromagnetic properties (where appropriate).

The manual actuator 104 comprises one end 104a pushing on the closure member 45 when it is actuated, said pushing causing the movement of the closure member 45 to the opening position. The valve 100 further comprises a spring 105 associated with the manual actuator 104 to cause the manual actuator 104 to recover its initial position once it is no longer being actuated (this allows for example the valve 100 being able to close with a pulse P-OFF of the coil 53 or, where appropriate, if the ferromagnetic elements 61 and 62 lose their ferromagnetic properties).

As occurred with the second embodiment, in other embodiments of the valve 100 related to the third embodiment, the valve 100 can be similar to the valve of the third embodiment but can comprise a number of through holes 40 different from four (even just one), can have a different distribution of the through holes 40, and/or can comprise a different configuration so that the spring 9 forces the valve 100 to be normally open instead of normally closed, the coil 53 needing to be fed a current so that it closes instead of opens. Furthermore, instead of two ferromagnetic elements 61 and 62, other embodiments can comprise a single ferromagnetic element arranged inside the bobbin 54 or arranged outside the bobbin 54 (surrounding it). In the first case the valve 100 would not need the part 106 because the ferromagnetic element would perform its function; the second end of the spring 9 would be fixed to the ferromagnetic element. In the case of having a single ferromagnetic element, the lines of the magnetic field generated by the permanent magnet 50 that are used are smaller than in the case of having two ferromagnetic elements, so the necessary power supply of the coil 53 would be greater.

What is claimed is:
1. A gas shut-off valve comprising:
a gas inlet,
a gas outlet,
an orifice that communicates the gas inlet with the gas outlet,
a closure member moveable between an open position and a closed position, in the open position the closure member is positioned to permit the gas inlet to communicate with the gas outlet, in the closed position the closure member is positioned to prevent the gas inlet to communicate with the gas outlet,
an electromagnetic actuator assembly including:
an electromagnet comprising a static armature having a first part and a second part and a hollow element moveable between a first axial position and a second axial position, the closure member being attached to and moveable with the hollow element with the first axial position corresponding to the closed position of the closure member and the second axial position corresponding to the open position of the closure member, the hollow element having an outer surface with a coil attached to and wound about the outer surface, the coil creating a first magnetic field when a first power pulse is supplied to the coil, a static permanent magnet and the second part of the static armature being traversed by the coil when the hollow element is in both the first and second axial positions;
the static permanent magnet, located between the first and second parts of static armature, and
a ferromagnetic element fixed to the hollow element so that the ferromagnetic element moves with the hollow element, the ferromagnetic element positioned in the electromagnetic actuator assembly such that when the first magnetic field is produced by the coil the ferromagnetic element resides within the first magnetic field;

a first resilient member that acts on the ferromagnetic element to urge the hollow element toward the first axial position; and the static armature, static permanent magnet, hollow element, coil and ferromagnetic element arranged so that when a power pulse of a first polarity is supplied to the coil the ferromagnetic element is attracted toward the static permanent magnet to cause the hollow element to be moved in a direction toward the static permanent magnet so as to assume the second axial position, and wherein when a power pulse of a second polarity, opposite the first polarity, is supplied to the coil the ferromagnetic element is urged in a direction away from the static permanent magnet to cause the hollow element to be moved in a direction away from the static permanent magnet when the hollow element is in the second axial position the ferromagnetic element remains attracted toward the static permanent magnet to hold the hollow element in the second axial position when the power pulse of the first polarity is no longer supplied to the coil, the hollow element being moveable from the second axial position to the first axial position only upon the power pulse of the second polarity being supplied to the coil when no power pulse is supplied to the coil the ferromagnetic element is not attracted to the electromagnet.

2. The gas shut-off valve according to claim 1, wherein the hollow element comprises an internal cavity, the ferromagnetic element being disposed in the internal cavity.

3. The gas shut-off valve according to claim 1, wherein the ferromagnetic element is passed through by the hollow element.

4. The gas shut-off valve according to claim 1, wherein the closure member has a first side facing the hollow element and a second side facing the orifice, the gas shut-off valve further comprising a manual actuator moveable between a first position and a second position, the manual actuator having an elongate member that does not interfere with the movement of the closure member when the manual actuator is in the first position, when the manual actuator is moved to the second position from the first position the elongate member acts on the second side of the closure member to cause the hollow element to be moved toward the second axial position.

5. The gas shut-off valve according to claim 4, further comprising a second resilient member that continuously urges the manual actuator toward the first position.

6. The gas shut-off valve according to claim 1, wherein the closure member has a first side facing the hollow element and a second side facing the orifice, the electromagnetic actuator assembly being housed within an enclosure, the closure member comprising a membrane having one or more openings extending between the first and second sides that communicate the gas inlet with the enclosure at all times.

7. The gas shut-off valve according to claim 1, wherein the ferromagnetic element is a curie point metal having a Curie point temperature of between 90° C. to 130° C., the hollow element being configured to move from the second axial position to the first axial position by the first resilient member when the ferromagnetic element attains a temperature of between 90° C. to 130° C.

8. The gas shut-off valve according to claim 1, wherein the electromagnetic actuator assembly resides within a first body with the gas inlet, gas outlet and orifice residing in a second body, the first and second bodies being joined to form the shut-off valve, the closure member forming a central part of a membrane, the membrane being arranged between the first and second bodies to form a gas-tight seal between the first and second bodies.

9. The gas shut-off valve according to claim 8, wherein the membrane has a first side facing the hollow element and a second side facing the orifice, the electromagnetic actuator assembly being housed within an enclosure, the membrane having one or more openings extending between the first and second sides that communicate the gas inlet with the enclosure at all times.

10. The gas shut-off valve according to claim 1, wherein the ferromagnetic element is arranged nearer to the closure member than the coil.

11. The gas shut-off valve according to claim 1, wherein when the hollow element is in the second axial position the ferromagnetic element is attracted to the static permanent magnet in a manner sufficient to maintain the hollow member in the second axial position even in the absence of the power pulse of the first polarity being supplied to the coil.

12. The gas shut-off valve according to claim 1, wherein the closure member is attached directly to the hollow element.

13. The gas shut-off valve according to claim 1, wherein the ferromagnetic element is attached directly to the hollow element.

* * * * *